United States Patent [19]
Mauger

[11] Patent Number: 5,943,339
[45] Date of Patent: Aug. 24, 1999

[54] DIGITAL COMMUNICATIONS SYSTEM

[75] Inventor: Roy Harold Mauger, Herts, United Kingdom

[73] Assignee: Northern Telecom Limited, Montreal, Canada

[21] Appl. No.: 08/875,336

[22] PCT Filed: Mar. 21, 1996

[86] PCT No.: PCT/GB96/00677

§ 371 Date: Jul. 10, 1997

§ 102(e) Date: Jul. 10, 1997

[87] PCT Pub. No.: WO96/31080

PCT Pub. Date: Oct. 3, 1996

[30] Foreign Application Priority Data

Mar. 24, 1995 [GB] United Kingdom .................. 9506024

[51] Int. Cl.$^6$ .............................. H04L 12/28; H04L 12/66
[52] U.S. Cl. ............................................ 370/397; 370/352
[58] Field of Search ..................................... 370/395, 399, 370/397, 400, 601, 468, 477, 232, 236, 238, 253, 352

[56] References Cited

U.S. PATENT DOCUMENTS 5,271,005  12/1993  Takase et al. ........................... 370/397
5,519,689  5/1996  Kim ......................................... 370/236

*Primary Examiner*—Huy D. Vu
*Assistant Examiner*—Chiho Andrew Lee
*Attorney, Agent, or Firm*—Lee, Mann, Smith, McWilliams, Sweeney & Ohlson

[57] ABSTRACT

In an ATM network a flexible AAL1 processor is connected to a similar AAL1 processor by a virtual circuit. This virtual circuit has n×64 kb/s capacity wherein each 64 kb/s channel or a P×64 kb/s subset of the capacity can be used for a separate call. The virtual circuit behaves similarly to trunk groups within present day digital networks and it is therefore termed a Virtual Trunk Group. Many Virtual Trunk Groups can be connected between the same two endpoints and contained within a virtual path thus forming a Virtual Route. The network is provided with a mechanism which allows the n×64 kb/s capacity to be changed by a managed process which ensures that established calls are not affected by the change of capacity. This change of capacity is performed in such a way that the clock systems of the two AAL1 processors are able to behave in the normal manner for synchronised or plesiochronous switching networks without incurring additional frame slips in the AAL1 data stream. Frame slips due to the behaviour of the clock systems are still processed in the normal manner.

7 Claims, 8 Drawing Sheets

Fig.6.

VIRTUAL PATH PROVIDES ENVELOPE OF ALLOCATED CAPACITY CONTAINING VIRTUAL ROUTE

ONE OR MORE VIRTUAL TRUNK GROUPS ADAPT ON A CALL BY CALL BASIS IMPLEMENT VIRTUAL ROUTE

VIRTUAL TRUNK GROUPS HAVE FIXED MINIMUM CAPACITY TO AVOID ECHO PROBLEMS

TRUNK UTILISATION — 100%

TIME OF DAY — 8:00, 10:00, 12:00, 14:00, 16:00, 18:00

DIGITAL COMMUNICATIONS SYSTEM

This invention relates to digital communications systems and in particular to systems embodying asynchronous transfer mode (ATM) technology.

BACKGROUND OF THE INVENTION

The asynchronous transfer mode (ATM) technology is a flexible form of transmission which allows any type of service traffic, voice, video or data, to be multiplexed together onto a common means of transmission. In order for this to be realised, the service traffic must first be adapted typically into 53 byte cells comprising 5 byte headers and 48 byte payloads such that the original traffic can be reconstituted at the far end of the ATM network. This form of adaptation is performed in the ATM adaptation layer (AAL).

An ATM exchange may support POTS or ISDN services as well as B-ISDN services. In an ATM exchange with 2 Mb/s trunk circuits with independent calls on each 64 kb/s channel it is desirable that traffic once adapted to ATM should remain in ATM up to the destination narrow band port. It is further desirable that a physical trunk at e.g. 155 Mb/s should be able to carry logical routes to more than one destination as 155 Mb/s is generally considered to be too large a capacity for trunking within a narrow band service network. If the logical routes are of n×64 kb/s where n≧6 then the cell assembly delay is reduced to the point that echo cancellation is no longer necessary. The cell assembly delay of a single 64 kb/s circuit is 6 msec which requires echo cancellation for interworking with the existing narrow band network.

It has been observed that the traffic demand on routes between narrow band exchanges varies widely during the business day. There is typically a busy hour at the start of the working day and a second busy hour following lunch which is usually at a somewhat lower demand level. Nominal peak capacity of a route also varies significantly throughout the year. Routes in residential districts may have different peak periods but are also dynamically variable to a similar degree. The need to avoid this congestion can require an uneconomic provision of resources to ensure that demand peaks can be met. In an approach to this problem it has been proposed that the capacity of the paths that are used to support traffic from specific services may be varied dynamically according to service demand, e.g. time of day. Such a technique is described in specification No. EP-A2-0635958 and in U.S. Pat. No. 5,271,005.

It is an object of the invention to provide an improved system and method for controlling the capacity of a virtual trunk group on a call-by-call basis.

SUMMARY OF THE INVENTION

According to one aspect of the invention there is provided an arrangement for conveying narrow band traffic over a virtual trunk group incorporated on a virtual path between sending and receiving ATM exchanges in a communications network, the traffic being carried in frames each provided with a pointer delineating the boundary of that frame, each exchange incorporating an ATM switch, a virtual path control for controlling the capacity of said virtual trunk group, a connection manager to which, in use, requests for new calls are directed, means for controlling the connection manager and the virtual path control, an embedded processor adapted to receive connection requests from the connection manager whereby to set up corresponding connections to the receiving switch and to notify the connection manager of the establishment of outgoing and incoming connections, and junctor means associated with said embedded processor for establishing a virtual channel between the sending and receiving exchanges, wherein the connection manager is adapted, responsive to connection requests, to send corresponding requests for capacity changes to the management function, said capacity change requests being relayed by the management function to the virtual path control, and wherein the virtual path control of a sending switch has means for communicating via the respective junctor means with the virtual path control of the receiving switch over said virtual channel whereby to signal said capacity changes to the receiving switch in the form of pointer violations so as to ensure the same rate of frame processing at both the sending and receiving switches.

According to another aspect of the invention there is provided a method for conveying narrow band traffic over a virtual trunk group incorporated on a virtual path between sending and receiving ATM exchanges in a communications network, the traffic being carried in frames each provided with a pointer delineating the boundary of that frame, each exchange incorporating an ATM switch, a virtual path control for controlling the capacity of said virtual trunk group, a connection manager to which, in use, requests for new calls are directed, means for controlling the connection manager and the virtual path control, an embedded processor adapted to receive connection requests from the connection manager whereby to set up corresponding connections to the receiving switch and to notify the connection manager of the establishment of outgoing and incoming connections, and junctor means associated with said embedded processor for establishing a virtual channel between the sending and receiving exchanges, wherein, in response to connection requests, corresponding requests for capacity changes are sent to the management function, said capacity change requests being relayed by the management function to the virtual path control, and wherein capacity changes in the virtual path control of a sending switch are communicated via said junctor means over the virtual channel to the virtual path control of a receiving switch to the receiving switch in the form of pointer violations so as to ensure the same rate of frame processing at both the sending and receiving switches.

This invention relates to a method and means by which VC capacity is exploited for narrow band 64 kbs constant bit rate and p*64 kbs constant bit rate traffic. This exploitation of capacity uses an enhanced variant of AAL1 subsequently referred to as dynamic structured data transfer which enables a VC to be increased in capacity on demand and on a call-by-call basis. Acceptance of new calls is controlled by processing functions which manage the allocated VP (virtual path) capacity under the control of the management system.

In the ATM network a flexible AAL1 processor is connected to a similar AAL1 processor by a virtual circuit. This virtual circuit has n×64 kb/s capacity wherein each 64 kb/s channel or a P×64 kb/s subset of the capacity can be used for a separate call. The virtual circuit behaves similarly to trunk groups within present day digital networks and it is therefore termed a Virtual Trunk Group. Many Virtual Trunk Groups can be connected between the same two endpoints and contained within a virtual path thus forming a Virtual Route. The network is provided with a mechanism which allows the n×64 kb/s capacity to be changed by a managed process which ensures that established calls are not affected by the change of capacity. The change of capacity is performed in such a way that the clock systems of the two AAL1 processors are able to behave in the normal manner for synchronised or plesiochronous switching networks without incurring additional frame slips in the AAL1 data stream. Frame slips due to the behaviour of the clock systems are still processed in the normal manner.

The capacity of the Virtual Route is controlled by a Knowledge Based System which adjusts the capacity based on a rule set which considers Time-of-day, nominal maximum capacity and a set of constraint rules. Constraint rules define such things as upper and lower bounds for the size of Virtual Route and Quality of Service objectives and are the means whereby the network operator is able to control the performance of the adaptive network. The Knowledge Based System keeps a record of past history of the route covering at least one year and adjusts its prediction of nominal maximum capacity based on analysis of current trends in relation to the historic daily variance. The Knowledge Based System working within its rule set adjusts the capacity of the virtual route such that:

The Quality of service objectives are met.

The control function adapts itself to long term trends in capacity demand for the Virtual Route to maintain the same quality of service.

Instantaneous peaks of traffic are handled within the upper and lower bound constraints.

Reference is here directed to our copending application No 9410294.4 (S D Brueckheimer, R H Mauger 7–6) which relates to a flexible implementation of ATM adaptation layer 1, and to our copending application No 9411894.0 (S D Brueckheimer, R H Mauger, A W Oliver, R J Dean 9-8-4-1) which relates to means of adapting the capacity of an n×64 kb/s AAL1 virtual circuit and its use to enable 64 kb/s switching in association with an ATM switch. The present invention relates to the use of the adaptive virtual circuit within a wide area network to provide Virtual Trunk Groups that can adapt automatically to changes in traffic demand.

BRIEF DESCRIPTION OF THE DRAWINGS

An embodiment of the invention will now be described with reference to the accompanying drawings in which:

FIG. 6 shows one possible method of using an adaptive AAL1 virtual circuit as a virtual trunk group as part of a Virtual Route

Any 64 Kb/s channels can be associated with any ATM virtual circuit.

Any group of P 64 Kb/s channels can be assembled together as part or whole of an ATM virtual circuit and will maintain time slot sequence integrity through the adaptation and transmission processes.

For conformance to AAL1 standards n is restricted to values from 1 to 30 for proprietary applications n can have any value up to the full capacity of the system.

The number of ATM virtual circuits m can be any value up to the limit of 1 64 Kb/s circuit per ATM VC i.e. $1 \leq M \leq 2048$ for this example.

Figure 1:
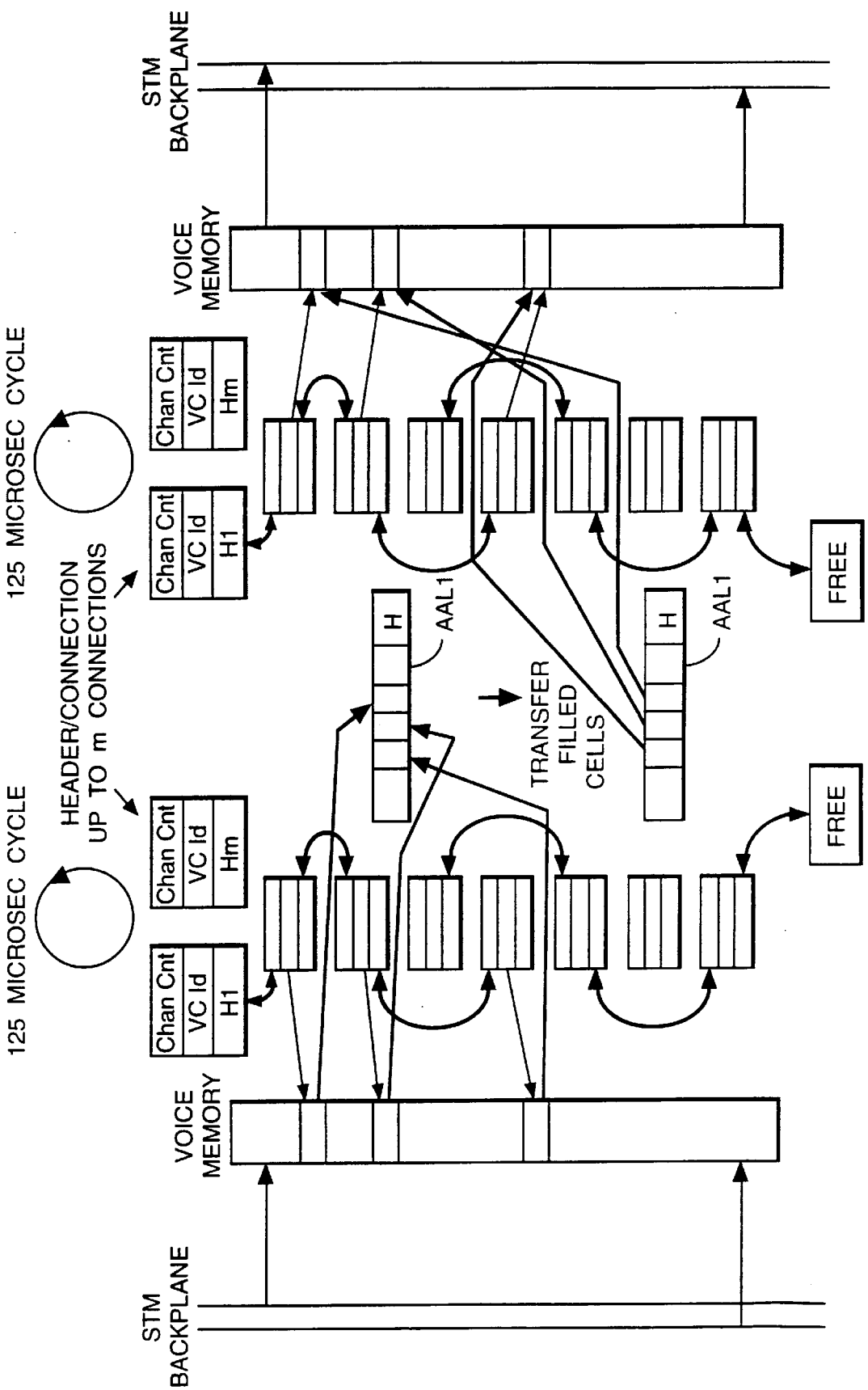
FIG. 1 is a schematic of a flexible AAL1 processor.
Figure 2:
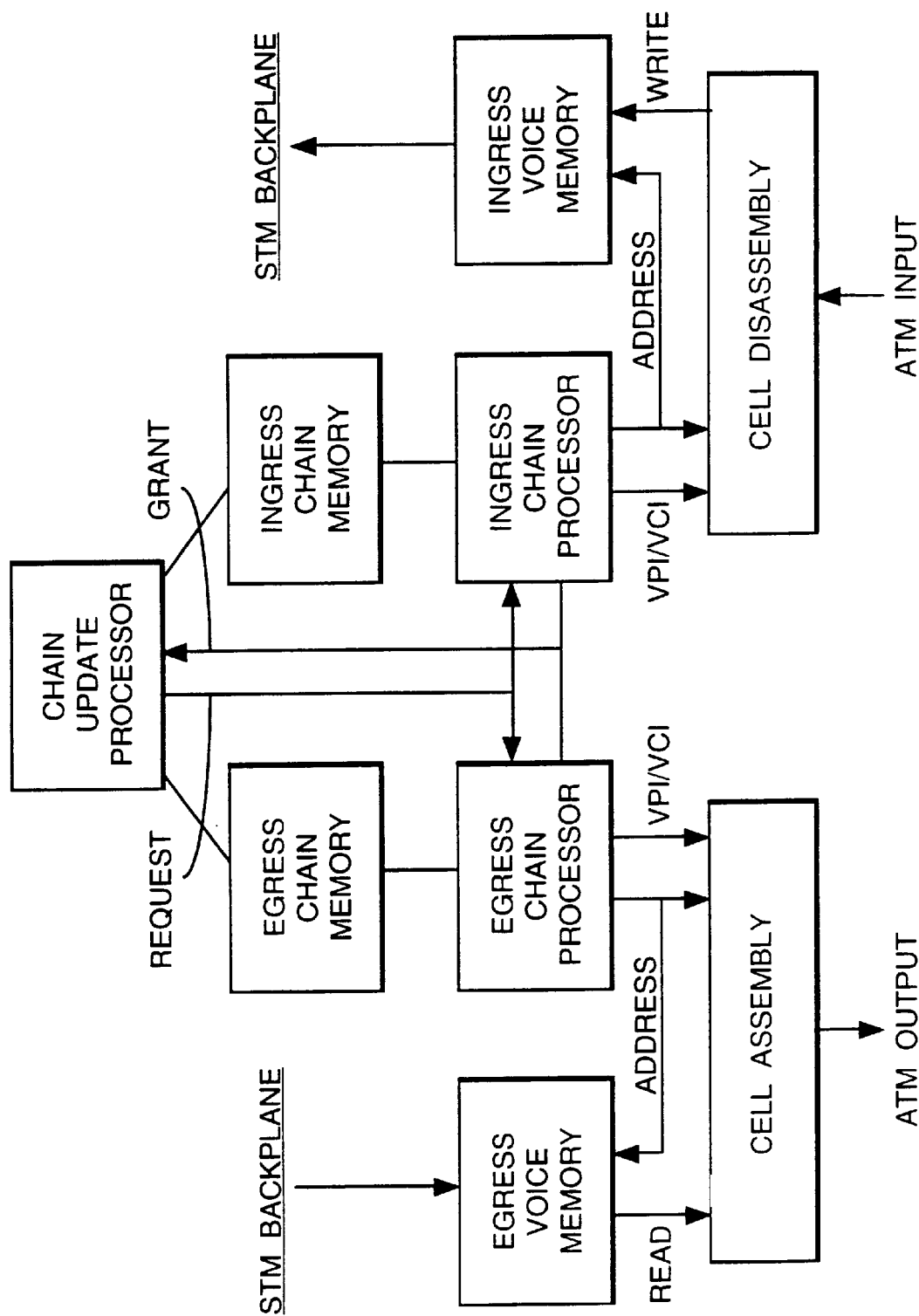
FIG. 2 is a more detailed schematic diagram of the processor of FIG. 1.

The principle of the mechanism is illustrated in FIG. 1 and the functional block diagram of its implementation is illustrated in FIG. 2. In both diagrams a process is implied, but not shown, which runs at 125 microsecond intervals and staticises the STM stream on the backplane into an egress chain memory and takes the contents of an ingress chain memory and distributes this as an STM stream to the backplane. The mechanism is controlled by a chain structure. Each link in the chain is embodied as a combination of two bidirectional pointers and an address in the egress or ingress memory, there is one link for each 64 Kb/s channel in each of the egress and ingress chains. Chains are linked to headers and there is one header for each potential n×64 Kb/s ATM virtual circuit, headers are embodied by the association of a channel count for control purposes, a VC identity for cell assembly purposes and a bidirectional pointer to the first link of the chain. A chain is assembled for each active ATM virtual circuit, it consists of a number of links which use bi-directional pointers to point upwards to the header or previous link and downwards to the next link. Each link contains the address in the frame memory of the required frame sample; links which have not been allocated are formed into a chain which is formed under a special FREE header. Separate egress and ingress chain processes are initiated each 125 microsecond cycle. These process each chain in turn and each link in the chain in turn and deliver an address to the voice memory and a VPI/VCI to a cell assembly or disassembly process. For the cell assembly process the frame samples are read at each address and change and placed in the next available byte position within the sell payload. Filled cells are assembled with their ATM Header and AAL1 SAT-PDU header and launched into the ATM. A new cell is then generated for that virtual circuit.

For the cell disassembly process cells are unpacked a byte at a time and frame samples are written to the ingress memory according to the address delivered by the ingress chain processor, on receipt of an indication from the AAL1 of the boundary of an n×64 Kb/s frame. The cell disassembly process then checks for phase synchronism between egress and ingress functions. The chains are updated under control of a chain update processor under instructions from the system control (not shown). The chain update processor operates a request/grant mechanism with the chain processors to ensure that a chain is not being modified at the same time as it is being processed. If an independent 64 Kb/s channel is being modified then it can be inserted or deleted from any point in the chain. An insertion process uses a link from the FREE chain. A deletion process returns a link to the FREE chain. If a P×64 Kb/s service is being set up then the channels must be inserted in the correct order in consecutive links in the chain.

Figure 3:
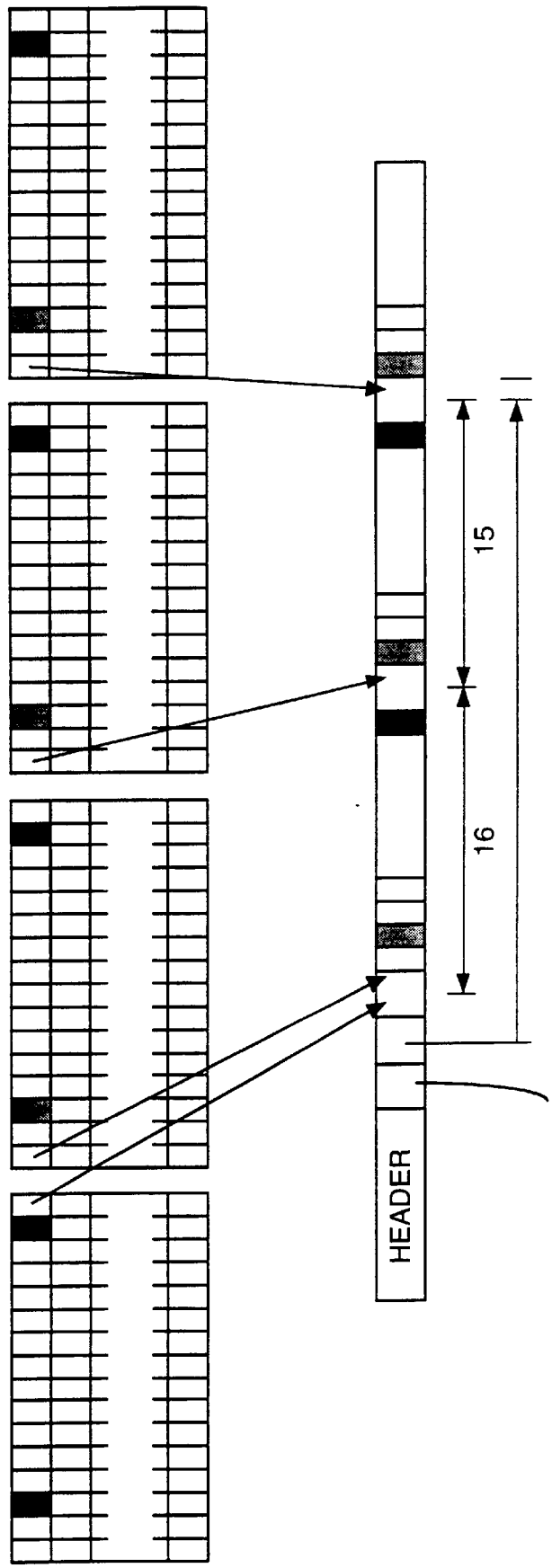
FIG. 3 shows how the AAL1 mechanisms can be used to indicate a change in the value of n in an n×64 kb/s virtual circuit
Figure 4:
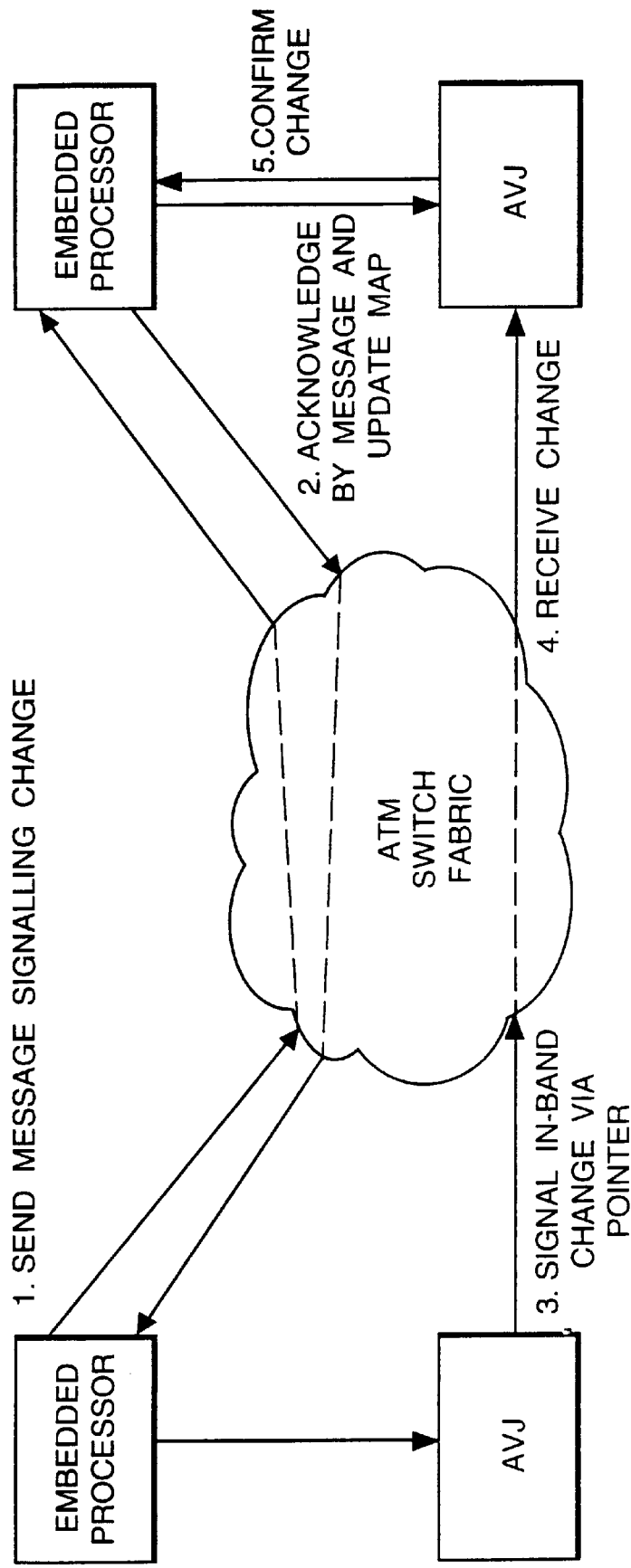
FIG. 4 shows how a rate change may be signalled across an ATM network

FIGS. 3 and 4 together provide an illustration of the means whereby the capacity of an AAL1 virtual circuit may be adapted, i.e. the manner in which the allocated number n of 64 kbit channels may be adjusted to accommodate variations in traffic demand.

FIG. 3 illustrates the operation of the Adaptation Layer AAL1 in its structured Data Transfer mode. In conventional operation the pointer delineates the boundary of a 125 microsecond frame so that individual 64 kb/s channels from the n×64 kb/s virtual channel can be identified and thereby individually manipulated, in the modified operation shown in FIG. 3, a pointer violation is used to indicate that the boundary has changed so that the capacity of the virtual channel can be dynamically changed. The pointer violation also indicates the exact frame timing of the change.

FIG. 4 illustrates the operation of the modified AAL1 within an overall signalling operation that ensures that both ends of the virtual channel adaptation layer are modified in synchronism. The Adaptive Virtual Junctor (AVJ) implements the modified AAL1 function, associated with the AVJ is an embedded processor which executes software functions associated with the AVJ device. All the embedded processors are able to send messages to each other over the ATM network over the ATM network. The AVJ at the end which initiates a change sends a message (1) to request a change the change details are recorded and the message acknowledged (2) this leads to the pointer violation being sent over the AAL1 virtual channel as described above (3) this is received by the AVJ at the other end of the virtual channel (4) which executes the change by updating its internal connection map and then confirms the change (5) to complete the process.

Figure 5:
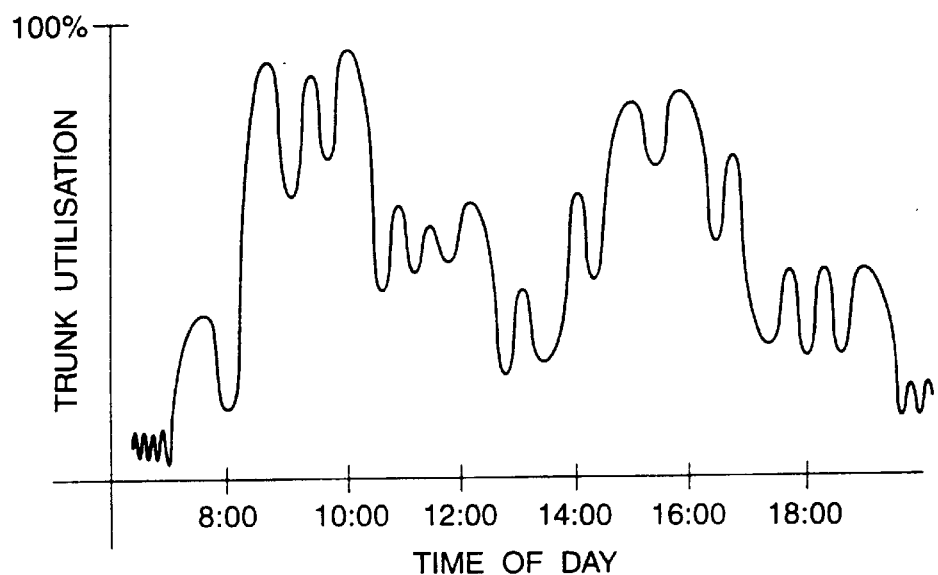
FIG. 5 shows the typical traffic demand variation for a route in a business district

The traffic demand on routes between narrow band exchanges varies widely during the business day as illustrated in FIG. 5, there is typically a busy hour at the start of the working day and a second busy hour following lunch which is usually at a somewhat lower demand level. Nominal peak capacity of the route varies significantly throughout the year. A route of 1000 trunk channels will typically have 20 connections or disconnections per second which may represent sharp reductions or increases in demand or even a level state of demand. Routes in residential districts have different peak periods but are also dynamically variable to a similar degree.

Figure 7:
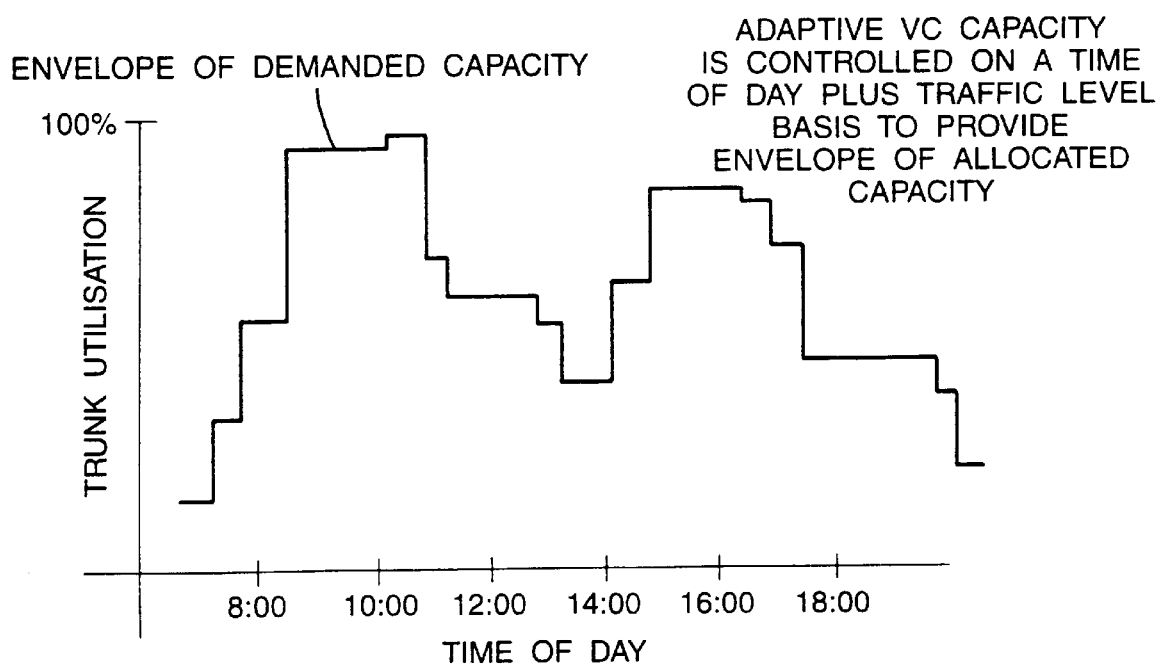
FIG. 7 shows an alternative method of using an adaptive AAL1 virtual circuit as a virtual trunk group

Our arrangement provides a mechanism within the ATM network to re negotiate the capacity assignment to a virtual path without disconnecting that virtual path. This mechanism can be used to generate capacity in an ATM network to allow a number of Virtual Trunk Groups to be supported as adaptive AAL1 virtual circuits within a Virtual Route. FIG. 6 shows one possible method of achieving such a Virtual Route in which the Virtual Route comprises a number of Virtual Trunk Groups implemented as adaptive AAL1 virtual circuits, each Virtual Trunk Group has a minimum capacity to avoid the need for echo cancellation but for any demand level above the minimum capacity then on a call by call basis the capacity of the adaptive AAL1 virtual circuit is changed-by 64 kb/s so that the virtual trunk group capacity is always exactly adapted to the traffic demand, changes to the Virtual Trunk Groups are made on a call by call basis but are constrained such that the total capacity of the set of Virtual Trunk Groups is never greater than the capacity of the Virtual Path which embodies the Virtual Route, the capacity of the Virtual Route is controlled by a mechanism which implements changes to the capacity of the Virtual Route according to an umbrella function which is established by a supporting knowledge based system. An alternative solution is shown in FIG. 7 in which the Knowledge based system controls directly the capacity of the Virtual Circuit implementing the Virtual Trunk Group so that separate control of a Virtual Path implementing a Virtual Route is not required. In the solution of FIG. 6 channels are only required to be persistent on the Virtual Trunk Group if a call is in progress whereas for the solution of FIG. 7 channels need to remain in existence on the virtual trunk group in anticipation of some future call attempt.

Figure 8:
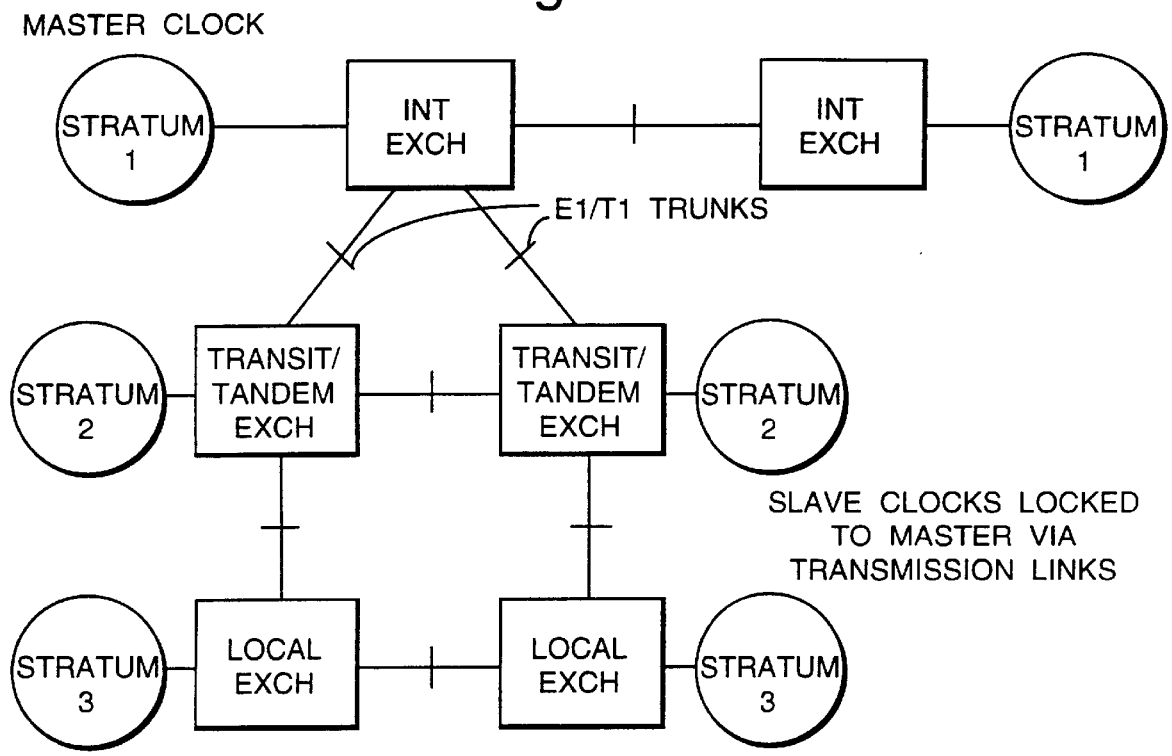
FIG. 8 shows the clocking arrangements for digital switching networks

Digital switching networks derive their timing from a hierarchy with three Strata of master and slave clocks as illustrated in FIG. 8. The master clocks at Stratum 1 may be Atomic clocks with an accuracy of 1 part in $10^{11}$. These are used as the basis of international plesiochronous working. In exchanges with Stratum 2 or 3 slave clocks, signals derived from transmission systems which are locked to the Stratum 1 standard are used in order to lock the local slave clock to the 1 part in $10^{11}$ accuracy. Such a structure is prone to disturbance as a result of equipment failure or operational disconnection so that real networks depart somewhat from the ideal of absolute synchronisation. On present day digital exchanges with 1.5 or 2.0 Mb/s trunk connections, a buffer is provided at the trunk termination which allows the difference between the send and received clock to be absorbed, this buffer is of limited capacity so that if the clock differences are persistent then the buffer adjusts to either repeat information if the buffer is starved or to delete information if the buffer is filled, this function is termed a slip.

Within a Virtual Trunk Group the receive process must maintain a buffer comprising a number of ATM cells. The adaptation layer of AAL1 Structured Data Transfer exchanges pointers between the send and receive process which define the frame boundary of the n×64 kb/s data stream so that, as a result, the rate of frame processing at the receive side is the same as at the send side. In consequence, the number of frames or partial frames held in buffer remains fixed despite the value of n in the n×64 kb/s stream being variable. Within a specific implementation n is variable within the range 47←n←1024 and the ATM cell buffer must hold two frames, for n=47 two frames equates to two cells whereas for n=1024 two frames equates to 44 cells, it follows that the number of cells in the receive buffer must vary as the value n is varied through its range. The role of the buffer is twofold, it compensates for timing differences between the send and receive clocks arising from jitter, wander or absolute differences in clock frequency, and in addition it compensates for the cell delay variation which is a characteristic of the ATM network. As such, a slip function analogous to that for existing trunk systems is implemented from this ATM cell buffer.

Figure 9:
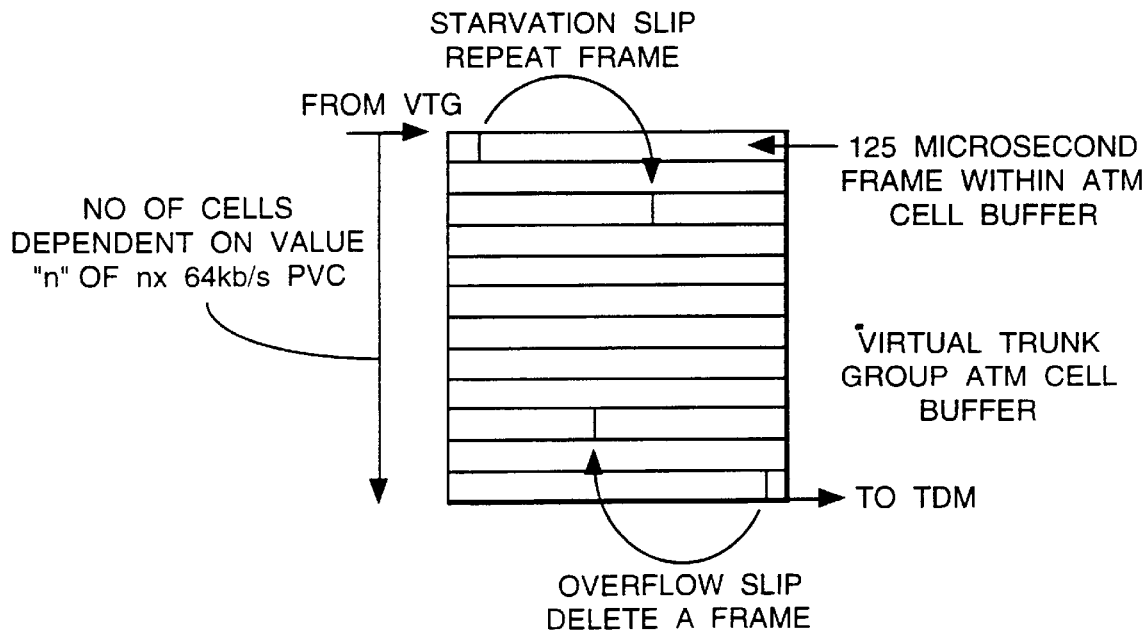
FIG. 9 shows the slip processing function of a Virtual Trunk Group

The slip mechanism is illustrated in FIG. 9. Slips may arise as a result of starvation or overflow. If at the beginning of a new 125 microseconds frame there is insufficient data in the buffer to permit a new frame to be processed then a starvation slip is invoked which repeats a frame of information whereas if a new cell arrives when the buffer is full it is necessary to delete a frame.

It is important that the changes in cell buffer size due to the variability of "n" should not lead to false indications of clock disparities and consequently to false slips. Within the cell buffer a frame of information may begin and end at any point in a cell payload and for larger values of "n" will contain a number of complete cells in addition. As "n" changes it is necessary to increase or decrease the number of cells within the buffer, in the change process as illustrated in FIG. 4 a message is sent ahead to alert the receive process that a change is intended, if this message indicates that the ATM buffer should be increased then the buffer size is changed immediately whereas if the message indicates that the buffer should be reduced then the buffer remains unchanged until the new value of pointer is received which indicates that the change in value of "n" has been completed and processed through the ATM receive buffer. This mechanism ensures that during the period of change in the cell rate between the message that indicates an intended change and the completion of the change the ATM receive buffer is always larger than or equal to the size required by the new cell rate and therefore does not cause a false slip.

Figure 10:
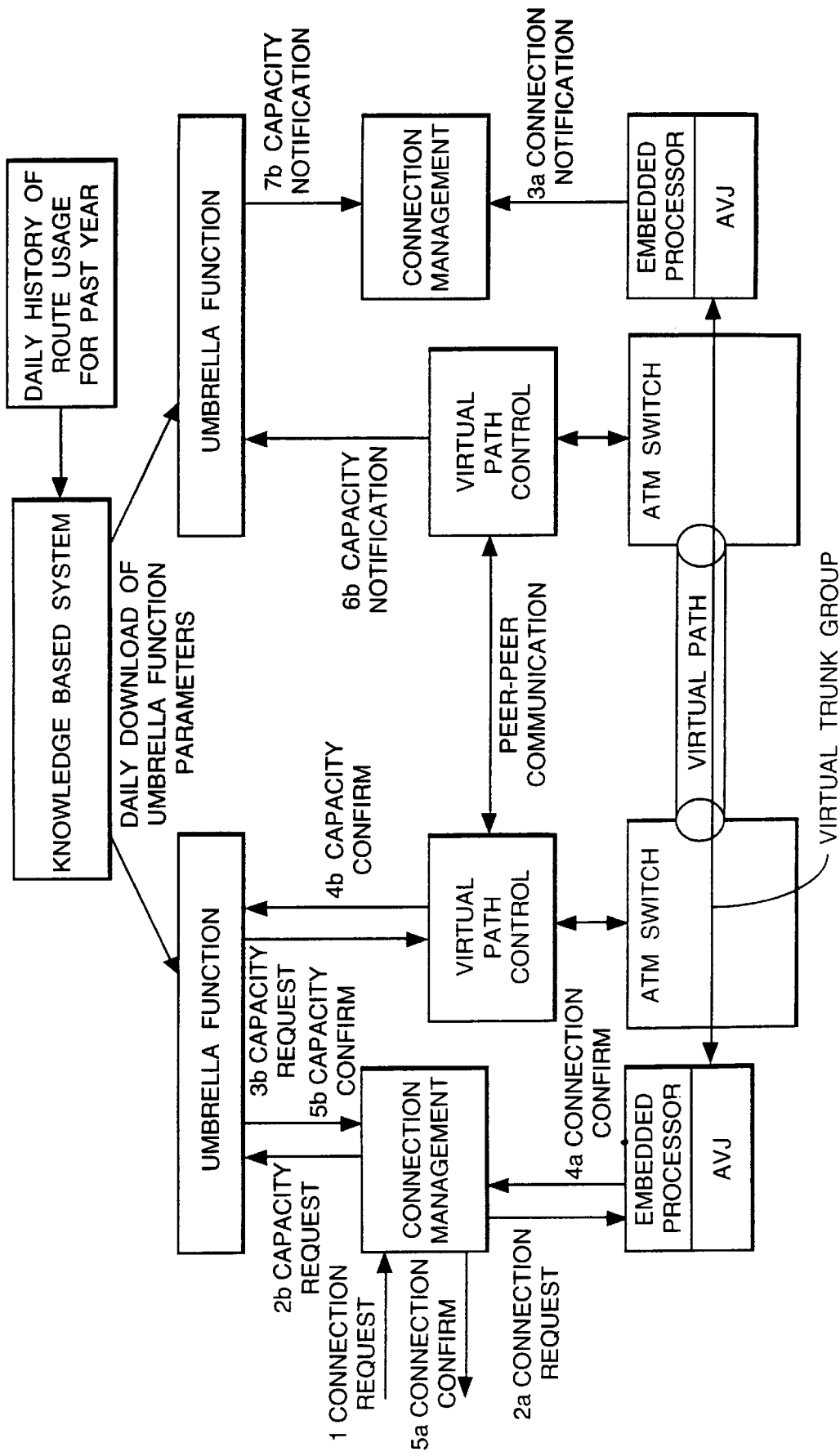
FIG. 10 shows a means whereby a Knowledge Based System may be used to implement the Virtual Route control FIGS. 1 and 2 together provide an illustration of the ATM AAL1 implementation. In a typical narrow band telecommunications system a common STM bus is available on the backplane of the equipment. This is used as the interface between the equipment which adapts external interfaces such as Analogue or ISDN lines and the equipment which performs the intrinsic function such as switching. An equipment which adapts to an external STM1 system would typically have 2048 64 Kb/s channels available on the backplane to the adaptation function. The purpose of the equipment is to allow the adaptation of a number of 64 Kb/s channels say 2048 into a number of n×64 Kb/s ATM virtual circuits and the readaptation to 64 Kb/s channels within the following constraints.

The role of the knowledge based system is illustrated in FIG. 10, the knowledge based system provides parameters on a daily basis which controls an umbrella or management function which implements the capacity control of the virtual path implementing the virtual route in real-time an example set of parameters to be downloaded to the umbrella function would be of the form:

Nominal Maximum Capacity

Maximum and Minimum capacity during assigned periods

Times of day of assigned periods

Step sizes for assigned periods these rules would then be used by the umbrella function to respond to requests for capacity. To those skilled in the art it is clear that a knowledge based system can be used to achieve such a function and that the many sets of rules could be implemented to give whatever accuracy of umbrella function is desired.

A single virtual route is illustrated between two ATM switches the capacity of this virtual route is implemented via a virtual path controlled by a virtual path control function. The virtual trunk group is implemented by a device called an Adaptive Virtual Junctor (AVJ) which has an embedded processor and is controlled by a Connection Management function. The process of changing virtual route capacity is illustrated by the sequence of messages:

1: A Connection Request for a new call is made to Connection Management.

2b: If Connection Management has too much or too little capacity on the route it requests the Umbrella or management function for a change in capacity.

2a: Without waiting for the additional capacity the Connection Management function uses the remaining capacity for the connection The embedded processor performs the functions of FIG. 4 to set up the connection and notifies Connection Management at the far end (3a) and confirms the connection locally 4a)

3b: The capacity request is passed onto the Virtual Path Control functions which uses standard ATM network functions to change the capacity providing capacity notifications at the far end (6b, 7b) and capacity confirmations at the near end (4b, 5b)

The arrangement thus provides a mechanism for adjusting the capacity of a AAL1 n×64 kb/s virtual circuit across an ATM wide area network without causing timing slips additional to those arising from differences between the clocks of the two end points of the virtual circuit.

It will also be appreciated that the path capacity may be controlled on a call by call basis, on the basis of the traffic history determined via the knowledge based system or from a combination of these parameters.

I claim:

1. An arrangement for conveying narrow band traffic over a virtual trunk group incorporated on a virtual path between sending and receiving ATM exchanges in a communications network, the traffic being carried in frames each provided with a pointer delineating the boundary of that frame, each exchange incorporating an ATM switch, a virtual path control for controlling the capacity of said virtual trunk group, a connection manager to which, in use, requests for new calls are directed, means for controlling the connection manager and the virtual path control, an embedded processor adapted to receive connection requests from the connection manager whereby to set up corresponding connections to the receiving switch and to notify the connection manager of the establishment of outgoing and incoming connections, and junctor means associated with said embedded processor for establishing a virtual channel between the sending and receiving exchanges, wherein the connection manager is adapted, responsive to connection requests, to send corresponding requests for capacity changes to the management function, said capacity change requests being relayed by the management function to the virtual path control, and wherein the virtual path control of a sending switch has means for communicating via the respective junctor means with the virtual path control of the receiving switch over said virtual channel whereby to signal said capacity changes to the receiving switch in the form of pointer violations so as to ensure the same rate of frame processing at both the sending and receiving switches.

2. An arrangement as claimed in claim 1, wherein means are provided for recording a diurnal pattern of traffic demand, and wherein said capacity is adjusted to match the demand pattern.

3. An arrangement as claimed in claim 2, wherein said recording means comprises a knowledge based system.

4. An arrangement as claimed in claim 1, wherein each said switch incorporates a buffer for storing received ATM cells, the number of cells being stored in the buffer being adjustable to match the current capacity or rate of the virtual path over which the cells have been received.

5. A method for conveying narrow band traffic over a virtual trunk group incorporated on a virtual path between sending and receiving ATM exchanges in a communications network each exchange incorporating an ATM switch, a virtual path control for controlling the capacity of said virtual trunk group, a connection manager to which, in use, requests for new calls are directed, means for controlling the connection manager and the virtual path control, an embedded processor adapted to receive connection requests from the connection manager whereby to set up corresponding connections to the receiving switch and to notify the connection manager of the establishment of outgoing and incoming connections, and junctor means associated with said embedded processor for establishing a virtual channel between the sending and receiving exchanges;

wherein the method comprises transporting the narrow band traffic in frames, providing each said frame with a pointer delineating the boundary of that frame, responding to said connection requests, by sending corresponding requests for capacity changes to the management function, said capacity change requests being relayed by the management function to the virtual path control, and communicating capacity changes in the virtual path control of a sending switch via said junctor means over the virtual channel to the virtual path control of a receiving switch to that receiving switch in the form of pointer violations so as to ensure the same rate of frame processing at both the sending and receiving switches.

6. A method as claimed in claim 5, wherein capacity changes in a virtual path are effected without disconnection of that path.

7. A method as claimed in claim 5, wherein said capacity adjustment is effected in a predetermined manner based on an acquired history of route usage.

\* \* \* \* \*